United States Patent [19]
Heiser et al.

[11] Patent Number: 4,910,662
[45] Date of Patent: Mar. 20, 1990

[54] BOOM CONTROL SYSTEM

[75] Inventors: Richard K. Heiser, Wayzata; Thomas R. Fulkerson, Watertown; Royal R. Hawkins, Bloomington; James R. Reed, Minneapolis, all of Minn.

[73] Assignee: Sundstrand-Sauer, Minneapolis, Minn.

[21] Appl. No.: 275,781

[22] Filed: Nov. 23, 1988

Related U.S. Application Data

[63] Continuation of Ser. No. 123,287, Nov. 20, 1987, Pat. No. 4,791,549, which is a continuation of Ser. No. 713,442, Mar. 19, 1985, Pat. No. 4,722,044.

[51] Int. Cl.⁴ ......................... G06F 15/20; E02F 3/72
[52] U.S. Cl. ............................... 364/167.01; 364/180; 414/700; 414/728
[58] Field of Search .................. 364/167.01, 478, 513, 364/160, 180, 142; 414/698, 699, 700, 718, 728, 750; 173/38, 43; 182/2; 248/654; 318/590, 591; 212/149-156, 159-165; 340/685; 37/DIG. 1, DIG. 19, 115-117; 172/2-4.5

[56] References Cited

U.S. PATENT DOCUMENTS

| | | | |
|---|---|---|---|
| 3,543,910 | 12/1970 | Devol et al. | 198/34 |
| 3,543,947 | 12/1970 | Devol | 214/1 |
| 3,726,428 | 4/1973 | Lark et al. | 214/763 |
| 3,802,589 | 4/1974 | Holtkamp | 214/770 |
| 3,890,552 | 6/1975 | Devol et al. | 318/568 |
| 4,162,873 | 7/1979 | Smith, Jr. | 414/718 |
| 4,178,591 | 12/1979 | Geppert | 340/685 |
| 4,288,196 | 9/1981 | Sutton, II | 414/699 |
| 4,332,517 | 6/1982 | Igarashi et al. | 414/699 |
| 4,482,288 | 11/1984 | Rovetta | 414/728 |
| 4,514,796 | 4/1985 | Saulters et al. | 364/142 |
| 4,553,899 | 11/1985 | Magni | 414/629 |

Primary Examiner—Joseph Ruggiero
Attorney, Agent, or Firm—Marshall, O'Toole, Gerstein, Murray & Bicknell

[57] ABSTRACT

Machines having a boom or arm pivotally disposed thereon wherein the length of the boom or arm and the angle thereof with respect to a reference plane are adjustable by means of actuators are well known. However, it is extremely difficult, if not impossible, to simultaneously control the actuators in a coordinated fashion to move the end of the boom or arm in a straight line path. In order to overcome this problem, a boom control system for a boom according to the present invention controls the actuators in either of two modes of operation, the first mode of operation comprising independent control over each actuator to afford polar coordinate operation and the second mode of operation comprising synchronized control over the actuators so that the end of the member may be moved in a straight line. Means are provided for manually selecting one of the two modes of operation. Means may be provided for calculating the amount of remaining horizontal throw of the boom or arm when a command to move same is issued.

17 Claims, 7 Drawing Sheets

BOOM CONTROL SYSTEM

This is a continuation of applicaton Ser. No. 123,287 filed Nov. 20, 1987, now U.S. Pat. No. 4,791,549, which is a continuation of application Ser. No. 713,442, filed Mar. 19, 1985, now U.S. Pat. No. 4,722,044.

TECHNICAL FIELD

The present invention relates generally to control systems, and more particularly to a control system for a boom or other member, the length and angle with respect to a reference plane of which are adjustable.

BACKGROUND ART

Various types of machines utilize a movable boom or arm having disposed on the end thereof a workhead or other function-performing device. An example of such a machine is a material handler which includes a boom having a workhead in the form of a set of pallet forks. The length of the boom and the angle of the boom with respect to a reference plane, such as a horizontal plane, are independently adjustable by means of actuators, such as rams or cylinders, in response to operator input to a control system. Such a control system is capable of polar coordinate operation or control, since the independent control over each actuator renders the end of the boom easily positionable in terms of a polar coordinate system defined by the parameters of boom length and boom angle.

One consequence of this polar coordinate control is that it is very difficult to obtain straight line movement of the end of the boom along an axis other than a line coincident with the longitudinal axis of the boom. This is due to the fact that the boom length and boom angle must be continuously varied in a synchronized fashion if such straight line movement is desired. It is extremely difficult, if not impossible, for an operator to obtain the necessary control over each of the actuators in order to effect such straight line movement, for example, when it is desired to move the above-described pallet forks horizontally to insert the forks under a pallet.

In order to overcome the above problem, manufacturers of machines which utilize such booms or arms have resorted to mounting the entire machine on rails between the machine body and the tracks or wheels thereof so that straight line movement of the end of the boom can be accomplished by moving the entire machine. This, obviously, is expensive and only affords straight line motion in a horizontal plane, assuming the machine is level. This is, therefore, a poor solution to the problem.

One type of control for moving the end of a robot arm in approximately a straight line is disclosed in Devol U.S. Pat. No. 3,543,910. This control system includes a control program which operates actuators for varying the arm angle and extension. The control program operates one of the actuators to cause an incremental displacement of the angle of the arm with respect to the horizontal. The system includes mechnical feedback apparatus for sensing this incremental displacement of the arm angle. The control program is responsive to this sensed incremental change in angle and controls the remaining actuator to change the arm length so that the end of the arm is moved in a path which is a stepwise approximation of a straight line.

Devol does not disclose the ability to use manual input to accurately control the travel of the end of the arm. This capability to respond to an input other than a preprogrammed input is essential in most applications. Moreover, the Devol control exerts only intermittent control over the actuators which in turn control the displacement of the end of the arm, and hence this control cannot produce true straight line movement.

SUMMARY OF THE INVENTION

In accordance with the present invention, a control system for a boom, arm or other member, the length and angle with respect to a reference plane of which are adjustable by means of actuators permits the end of the boom to be moved in a chosen straight line in a simple and effective manner.

The control system includes controlling means for operating the actuators in either of two modes of operation. The first mode of operation is the conventional polar coordinate mode of operation in which independent control over each actuator is exercised. The second mode of operation, also referred to as orthographic coordinate mode of operation, comprises synchronized operation of the actuators so that the end of the member may be moved in a straight line. Means are coupled to the controlling means for manually selecting one of the two modes of operation.

In a preferred form of the invention, the controlling means includes a pair of parallel-connected valves for controlling each actuator. A first valve of each pair comprises a manual hydraulic valve. One or both of these manual valves can be manipulated in the first mode of operation to exercise independent control over each actuator. A second valve of each pair comprises an electrohydraulic valve which is controlled by a processor, such as a microcomputer. The processor receives inputs from sensors representing the position of the boom or arm and an input from a mode switch. When the mode switch is moved to a particular position, the actuators are operated in the orthographic coordinate mode of operation whereby manipulation of one of the manual valves to change either the boom extension or angle causes the processor to operate the electrohydraulic valve associated with the other actuator so that straight line movement of the end of the member is effected.

The processor of the control system may also include means operative in the orthographic coordinate mode of operation for preventing a condition wherein one of the electrohydraulic valves cannot provide sufficient flow to an actuator to effect the desired straight line movement. In such a case, the other electrohydraulic valve is operated by the processor to reduce the admittance of pressurized fluid to the other actuator to thereby maintain the straight line movement.

In a second embodiment of the invention, one of the actuators, for example the length actuator, is controlled only by a manual valve. In this embodiment, when the mode switch is in the particular position to cause operation in the orthographic mode, manipulation of this manual valve causes a change in the length of the boom, which change is sensed by the processor. In response to this change in length, the processor controls the electrohydraulic valve so that the angle of the boom is changed so that the end of the boom is moved in a straight line.

In a further embodiment of the invention, the manual valves are not used, and instead a joystick is coupled directly to the processor. The joystick includes a mode switch which is movable between first and second positions for causing operation of electrohydraulic valves in the first and second modes to in turn control the boom length and angle. In this case, the processor, when controlling the actuators in the second or orthographic coordinate mode of operation, exerts simultaneous and continuous control over the actuators so that the end of the boom or arm is moved in a true straight line.

In a still further embodiment of the invention, the single joystick is replaced by two joysticks, one of which controls the electrohydraulic valves and actuators in the first mode of operation while the second joystick controls the valves and actuators in the second mode of operation.

Preferably, the control system includes means for calculating the remaining reach or throw that the boom or arm can accomplish when the processor is commanded to effect movement in the second mode of operation. If this reach is less than a preselected amount, a warning may be issued to the operator by a visual or audible alarm.

The control system may be implemented by simple modifications to equipment already installed in most machines. The control system is thus applicable to a wide variety of devices and greatly increases the capabilities of same.

BEST MODE FOR CARRYING OUT THE INVENTION

Figure 1:
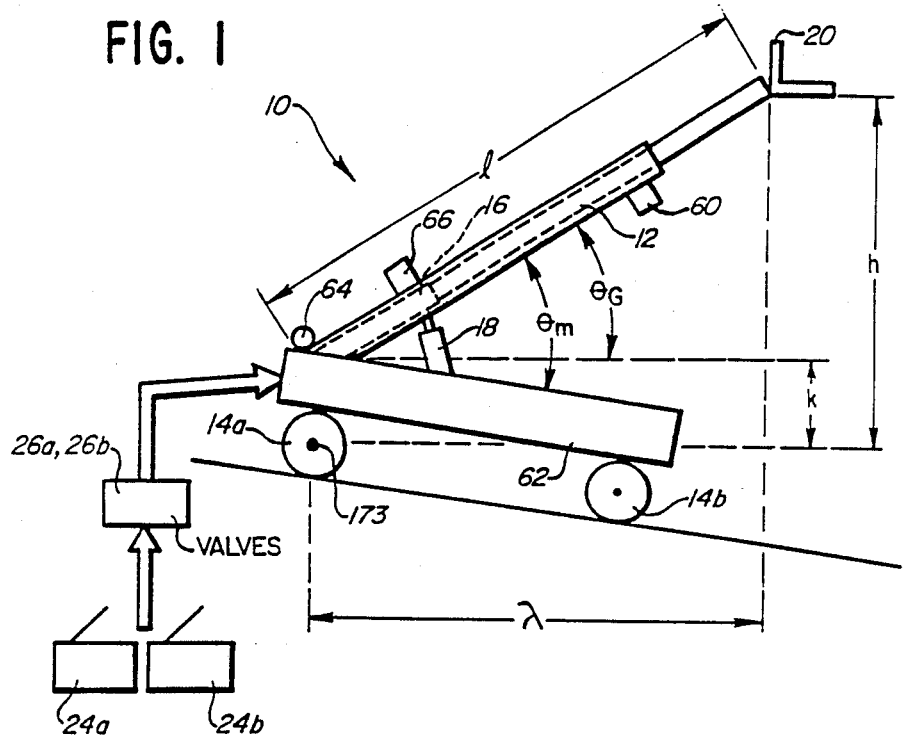
FIG. 1 is a diagrammatic illustration of a machine which includes an adjustable length boom or arm in conjunction with a conventional control.

Referring now to FIG. 1, there is illustrated in diagrammatic form a machine 10 which includes a boom or arm 12 pivotally mounted thereon. The machine 10 may be disposed on ground support means such as tracks or two or more sets of wheels 14a,14b.

The length or extension of the boom 12 is adjustable by means of an actuator in the form of a ram or cylinder 16. A second actuator such as a ram or cylinder 18 controls the angle of the boom with respect to a reference plane, such as the horizontal plane or a plane defined by the base of the machine 10.

Mounted on the end of the boom 12 is a workhead 20. For the example shown in FIG. 1, the machine 10 is a material handler and the workhead 20 comprises a set of pallet forks. As is conventional, means (not shown) are provided for maintaining the attitude of the forks in a level condition.

The actuators 16 and 18 are operated in accordance with input commands provided by an operator via manually operated command devices, such as a pair of levers 24a,24b. The levers operate control valves 26a, 26b which in turn control the delivery of pressurized fluid to the actuators 16,18.

The conventional control illustrated in FIG. 1 independently controls the valves 26a,26b, and hence the actuators 16,18. That is, the boom length $l$ can be changed independently of the boom angle $\theta_m$ depending on the movement of the levers 24. For example, manipulation of the lever 24a may change the boom length while manipulation of the lever 24b changes the boom angle. Simultaneous manipulation of both levers causes a simultaneous change in the boom angle and boom extension.

At times, it may be desirable to move the workhead on the end of the boom in a straight line path, such as when the set of forks 20 are to be used to pick up a pallet. In such a case, an operator must undertake a complicated coordinated series of maneuvers of the levers 24 to obtain horizontal straight line motion. In fact, the required maneuvering of the levers 24 may be so complex that the horizontal travel of the workhead cannot be controlled to a sufficient degree to insure safe retrieval of the pallet.

In order to overcome this problem, a control system is added to the machine 10 of FIG. 1 which affords sufficient control over boom movement so that the end of the boom can be moved in a straight line. It should be noted that the control system of the present invention is not limited to use with only material handlers of the type shown in FIG. 1, but may be utilized with any device having a member whose length and angle with respect to a reference plane are adjustable.

The control system includes a processor, in the form of a microcomputer 27, which controls first and second electrohydraulic, or EH valves 28a,28b. The EH valves 28a,28b are coupled in parallel configuration with the manual valves 26a,26b, respectively, as noted more particularly below.

In the preferred embodiment, the valves 28a,28b are electrohydraulic pressure control pilot (PCP) valves, for example as disclosed in Sjolund U.S. Pat. No. 4,362,182, issued Dec. 7, 1982, entitled "Nozzle Force Feedback for Pilot Stage Flapper", assigned to the assignee of the instant application and the disclosure of which is hereby incorporated by reference. The PCP valves may be used with boost stages to provide the necessary proportional control flow to control the actuators 16,18, and hence the extension of the boom and the angle thereof.

The microcomputer 27 includes a central processing unit, or CPU 38, a random access memory or RAM 40 and a read only memory, such as an erasable programmable read only memory, or EPROM 42. The control program for the system is stored in the EPROM 42 while the CPU carries out the required calculations of the control program. The RAM 40 stores various final and intermediate results of the calculations by the CPU 38.

The microcomputer 27 also includes first and second valve drivers 44,46, which develop appropriate signal levels to operate the valves 28a,28b. As noted more specifically below, the microcomputer 27 receives inputs from a mode switch 34 and signals representing the position of the boom 12.

The actuators 16,18 are controlled in either of two modes of operation. The first mode of operation is referred to as the polar coordinate mode of operation which comprises conventional independent control over each of the actuators 16,18, by means of the levers 24a, 24b and valves 26a,26b. This mode of operation is identical to that described in connection with FIG. 1.

The second mode of operation is referred to as the orthographic coordinate mode of operation and comprises synchronized control over one or both actuators 16,18 so that the end of the boom 12 can be moved in a straight line. This operation is described in greater detail below.

The selection of the mode of operation of the actuators is effected by the positioning of the mode switch 34. When the switch is in a first position, the actuators are operated in the polar coordinate mode of operation. When the switch is moved to a second position, the actuators are operated in the second or orthographic coordinate mode of operation.

As previously noted, the microcomputer 27 receives signals representing the position of the boom 12. These signals are representative of the boom length l as sensed by a length sensor 60 shown in FIG. 1, the boom angle $\theta_m$ with respect to the base 62 of the machine 10 as sensed by an angle sensor 64 and the direction of gravity as developed by a pendulum sensor 66. The pendulum sensor renders the control insensitive to the inclination of the base 62 of the machine 10.

In the preferred embodiment, each of the length and angle sensors 60,64 comprises a pair of transducers, one of which is an analog transducer and the other of which is a digital transducer. The analog transducers develop signals which represent the gross position of the boom when a command for movement is issued. The digital transducers develop signals representing the incremental change in the position of the boom as it is moving in response to the issued command.

It has been found that the combination of analog and digital transducers is desirable as a failsafe preventive measure in the case of power loss or other transients causing erroneous information to be developed in the computer memory. Further, each device can be used to cancel the inherent weaknesses of the other device.

For example, the output from a single analog transducer cannot be resolved in fine enough increments by currently practical analog-to-digital converters to afford a sufficient degree of control. At the present time, the practical limits of resolution of such analog length and angle transducers when using an 8-bit analog-to-digital converter are one inch in length and 1.2 inches about the arc of movement of the boom for a machine having 18 feet of boom extension and 75° of angular movement.

On the other hand, digital transducers can provide the necessary resolution; however, such transducers are not reliable as analog transducers, are expensive and encounter signal transmission problems.

By using the analog sensor to provide gross position information at the start of a commanded movement and by using the digital transducer to provide incremental position changes, these disadvantages are avoided and accurate control over movement of the end of the boom is achieved.

Figure 3:
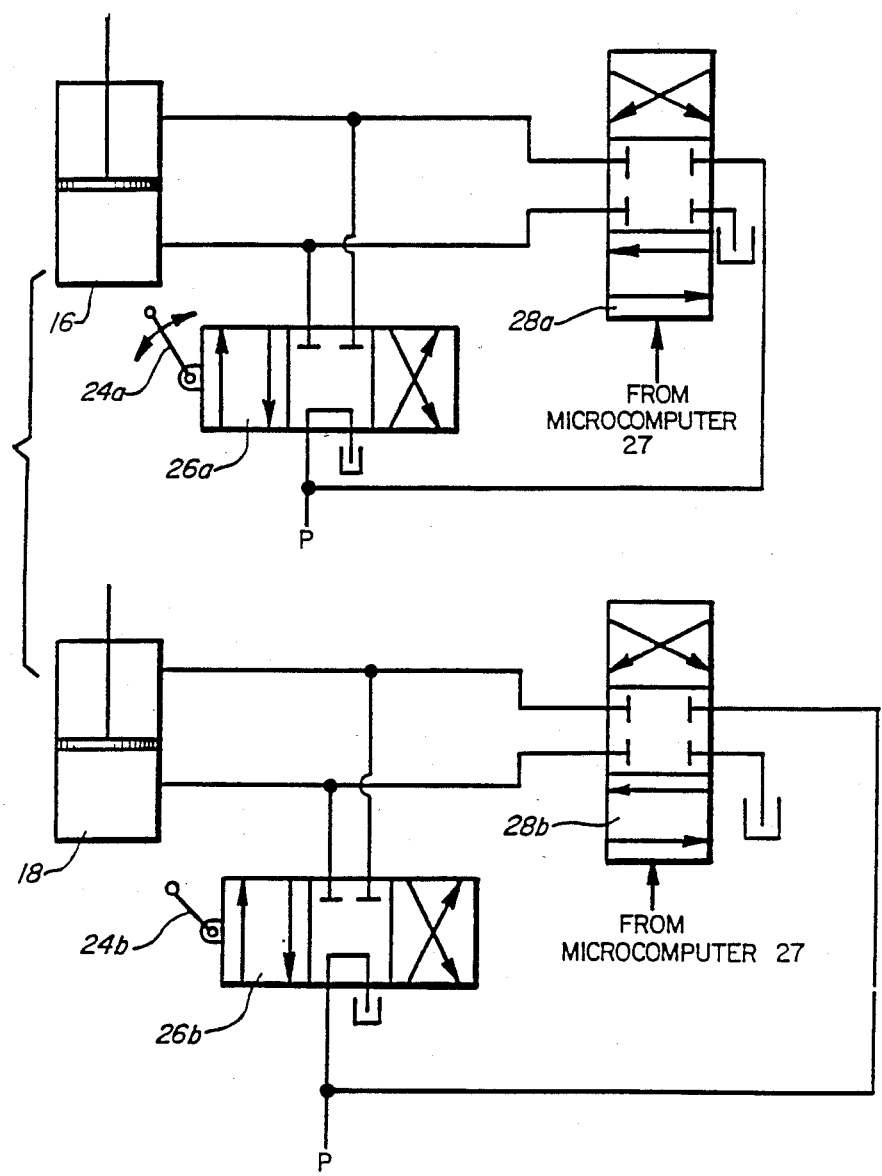
FIG. 3 is hydraulic circuit diagram of the valves and actuators shown in FIG. 2.

Referring now to FIG. 3, there is illustrated a hydraulic circuit diagram of the valves 26,28 and the actuators 16,18. Each of the valves 26,28 comprises a closed center four way valve which controls the application of pressurized fluid from a pressure line P and the exhaust of such fluid to tank.

Referring again to FIG. 2, each of the manual valves 26a,26b generates a signal output over lines 47a, 47b, respectively, indicating whether the lever 24 controlling such valve has been moved out of a neutral position. The signals on the lines 47a,47b, therefore represent operation of the actuators 16,18 by the valves 26a,26b.

Figure 4:
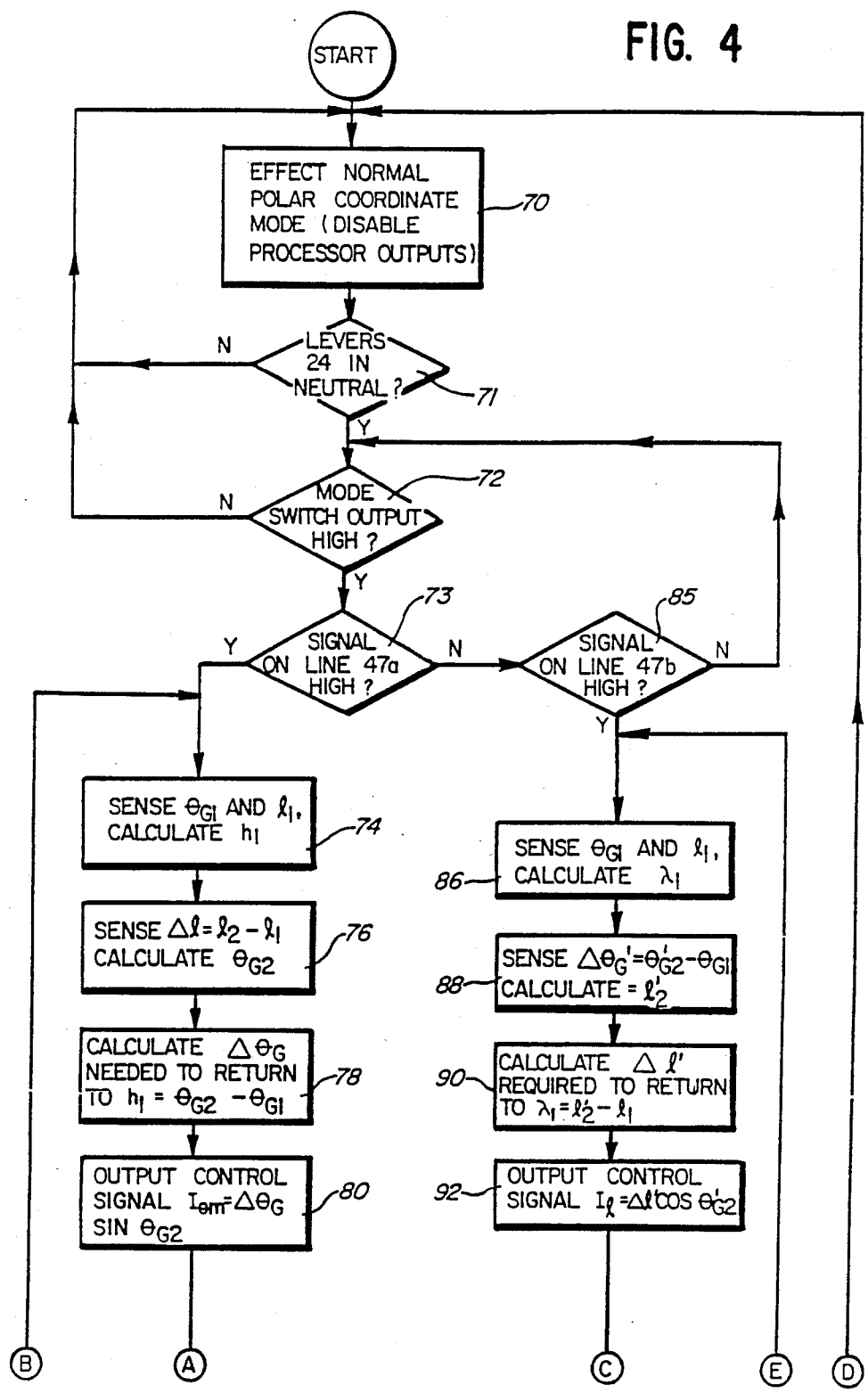
FIG. 4 comprises a flow chart of the control program stored in the memory shown in FIG. 2.
Figure 4:
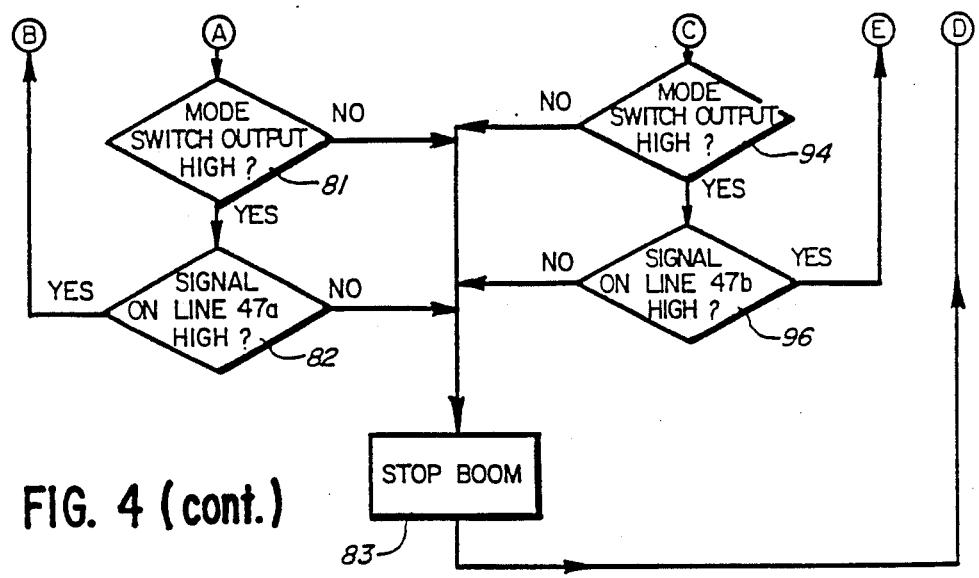

Referring also to FIG. 4, there is illustrated a flow chart of the control program stored in the EPROM 42 of the microcomputer 27.

The control program includes a first portion, illustrated by block 70, which effects the normal or conventional polar coordinate operating mode when the mode switch 34 is in a first position. The block 70 disables the microcomputer output so that the actuators 16,18 are directly controlled only by the levers 24a,24b of the manual valves 26a,26b.

A block 71 checks the signal on the lines 47 to determine whether both levers 24 are in the neutral position. If this is not the case, control returns to the block 70 to resume the polar coordinate mode of operation. At this point it is desirable to prevent entry into the second mode of operation if the levers are not in the neutral position since a dangerous condition might arise if one attempts to command straight line movement while the levers are out of the neutral position.

Following the block 71, a block 72 checks to determine whether the output of the mode switch 34 is in a high state. If this is not the case, control returns to the block 70. On the other hand, if the output of mode switch is in a high state, control passes to a block 73 which checks to determine whether a high state signal is being coupled over the line 47a to the processor 27. If this is the case, the lever 24a has been moved out of the neutral position and hence a command has been issued to change the boom length l.

When the lever 24a is moved from the center position and the mode switch output is high, control passes to a series of blocks 74–82. In this case, the operation of the actuator 18 is "slaved" to the operation of the actuator 16 so that the end of the boom is moved in a stepwise approximation of a straight line.

Generally, as the manual commands are entered by means of the manual valve 26a, the actuator 16 changes the length of the boom 12. Each incremental change in boom length is sensed by the length transducer 60 described in connection with FIG. 1. The microcomputer 27 in response to the sensed change in length calculates the required displacement of the actuator 18 to maintain the desired movement of the end of the boom.

The blocks 74–82 are effective to move the end of the boom in a stepwise approximation of a horizontal line; however, by suitable modification of the program, the end of the boom can be moved in any other straight line, such as a vertical line, if desired. Further, the size of the steps may be made as small as desired depending upon the limits of resolution of the position sensors, as should be evident.

The block 74 senses the output of the sensors 60, 64 and 66 and calculates a value $h_1$ according to the following equation:

$$h_1 = l_1 \sin \theta_{G1} + k \tag{1}$$

where $l_1$ is the sensed length of the boom 12 and $\theta_{G1}$ is the sensed angle of the boom relative to the horizontal, as determined from the outputs of the angle sensors 64 and the pendulum sensor 66. The term k is a value representing the distance between the pivot point of the boom 12 where it joins the base 62 of the machine and the rear axle 73. The term k varies with the inclination of the base 62 relative to the horizontal; however, this variation is small for the expected range of inclinations encountered in normal use, and hence the term k is treated as a constant.

Following the block 74, control pauses until an incremental change in length $\Delta l$ is sensed by the length sensor 60. When this occurs, a block 76 utilizes the new length $l_2$ of the boom to calculate a quantity $\theta_{G2}$ as follows:

$$\theta_{G2} = \arc \sin \frac{(h_1 - k)}{l_2} \tag{2}$$

A block 78 then calculates the change in angle $\Delta \theta_G$ of the boom that is required to maintain the end of the boom at the desired height $h_1$. This is accomplished by subtracting from the value $\theta_{G2}$ the value $\theta_{G1}$ representing the angle of the boom as sensed by the block 74.

A block 80 then generates a control signal $I_{\theta m}$ as follows:

$$I_{\theta m} = \Delta \theta_G \sin \theta_{G2} \tag{3}$$

In equation (3), the term $\sin \theta_{G2}$ is required to keep the rate of change of this control signal within reasonable values.

A block 81 again checks the output of the mode switch 34. If the output is in a high state, a block 82 checks to determine if the lever 47a has been returned to the neutral position. If not, control returns to the block 74 wherein the straight line movement is continued.

If however, the output of the mode switch 34 is not high or the lever 24a has been returned to the neutral position, a block 83 stops further movement of the boom and control returns to the block 70. The actuators are thereafter operated in the first mode of operation.

The programming also includes means for "slaving" the operation of the actuator 16 to the operation of the actuator 18. When the block 73 detects a low state signal on the line 47a, control passes to a block 85 which determines whether the lever 24b has been moved from the neutral position. If not, control returns to the block 72. On the other hand, if a high state signal is coupled over the line 84, control passes to a series of blocks 86–96 which move the end of the boom in a vertical line. It should be noted, however, that by suitable modification of the programming, the end of the boom may be moved in another straight line, such as a horizontal line, if desired.

The block 86 senses the parameter $\theta_{G1}$ and l and calculates therefrom a quantity $\lambda_1$ as follows:

$$\lambda_1 = l_1 \cos \theta_{G1} \tag{4}$$

Following the block 86, control pauses until an incremental change in angle $\Delta \theta_G'$ is sensed by the angle sensors 64 and the pendulum sensor 66 (the prime marks used in blocks 86–92 are used to distinguish from terms used by blocks 74–80 described above). When this change in angle is sensed, a block 88 calculates a quantity $l_2'$ from the new angle $\theta_{G2}'$ as follows:

$$l_2' = l_1 \cos \theta_{G2}' \tag{5}$$

A block 90 then calculates the change in length $\Delta l'$ of the boom that is required to maintain the end of the boom at a desired horizontal distance $\lambda_1$. This is accomplished by subtracting from the value $l_2'$, the value $l_1$ representing the length of the boom as sensed by the block 86.

A block 92 then generates a control signal $I_l$ as follows:

$$I_l = \Delta l' \cos \theta_{G2}' \tag{6}$$

Following the block 92, control passes to a pair of blocks 94,96 identical to the blocks 81,82 described above. When the block 94 detects that the output of the mode switch 34 is in a low state or when the block 96 detects that the signal on the line 47b is in a low state, the block 83 stops further movement of the boom and control thereafter returns to the block 70 wherein the normal polar mode operation is accomplished.

Figure 4A:
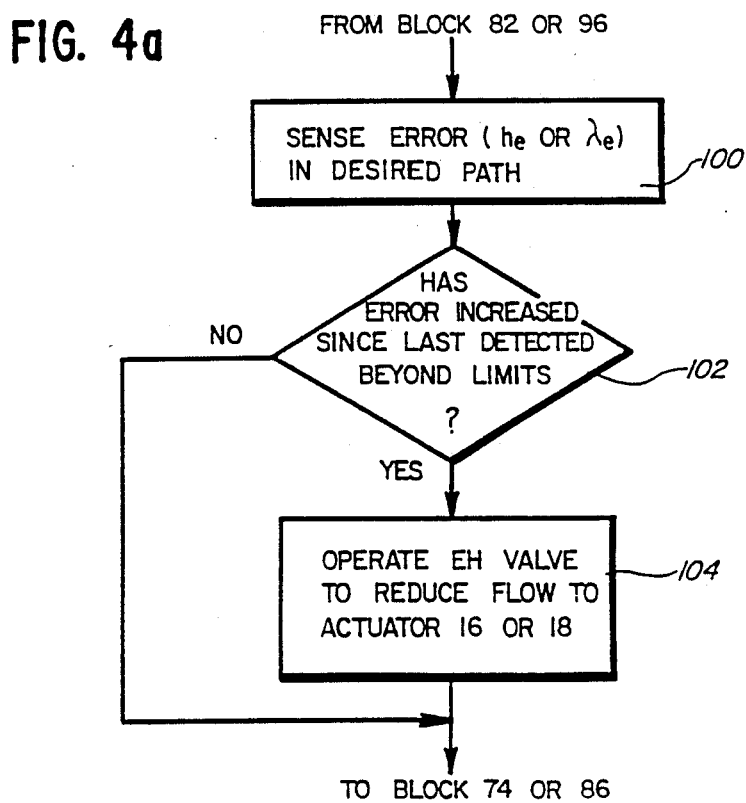
FIG. 4a comprises a flow chart of a modification to the program shown in FIG. 4 for implementing a first alternative embodiment of the invention.

It should be noted that the programming shown in FIG. 4 may be modified as shown in FIG. 4a to correct errors in the desired path of travel of the end of the boom 12. For example, the programming of FIG. 4a may be used to prevent a situation wherein operation of one of the valves 26 causes the microcomputer 27 to attempt to drive the electrohydraulic valve 28b,28a coupled in parallel with the other valve 26 beyond its rated capacity. The modification illustrated in FIG. 4a may be inserted immediately before the block 83 shown in FIG. 4 after the blocks 81,82 and/or 94,96.

The program shown in FIG. 4a begins at a block 100 which detects the error $h_e$ or $\lambda_e$ representing the path deviation of the end of the boom from the desired straight line path. Following the block 100, a block 102 checks to determine whether this error has increased beyond a predetermined limit. This limit may, for example, be indicative of a condition wherein one of the electrohydraulic valves 28a,28b is overdriven by the processor 27. For example, if the manual valve 26a is moved from its neutral position to effect a change in the length of the boom in a manner which causes the microcomputer 27 to develop a high level signal for operating the valve 28b, a situation might arise where the valve 28b is driven to capacity and cannot provide adequate flow to the actuator 18 to maintain the straight line movement. In this event, the position of the end of the boom will increasingly deviate from the desired straight line path. If this error in position increases beyond the predetermined limit, a block 104 generates a valve control current $I_{lc}$ according to the equation:

$$I_{lc} = \Delta \theta_G \sin \theta_{G2} \tag{7}$$

This current operates the other EH valve 28a to connect the pressure line P to tank in a controlled fashion to reduce the flow of hydraulic fluid delivered to the actuator 16. Since the actuator 16 is thereafter driven at a reduced rate, the EH valve 28b will eventually be capable of providing the required flow to the actuator 18 to maintain the desired straight line movement.

In the event that EH valve 28a is controlled by the processor 27 to effect straight line movement in response to manipulation of the valve 26b, the block 104 generates a valve control current $I_{\theta c}$ for the valve 28b as follows:

$$I_{\theta c} = \Delta l' \cos \theta_{G2}' \qquad (8)$$

This valve control current will reduce the flow to the actuator 18 when the path deviation or error is greater than the predetermined limit to in turn reduce the path error and permit the desired straight line movement.

Figure 2:
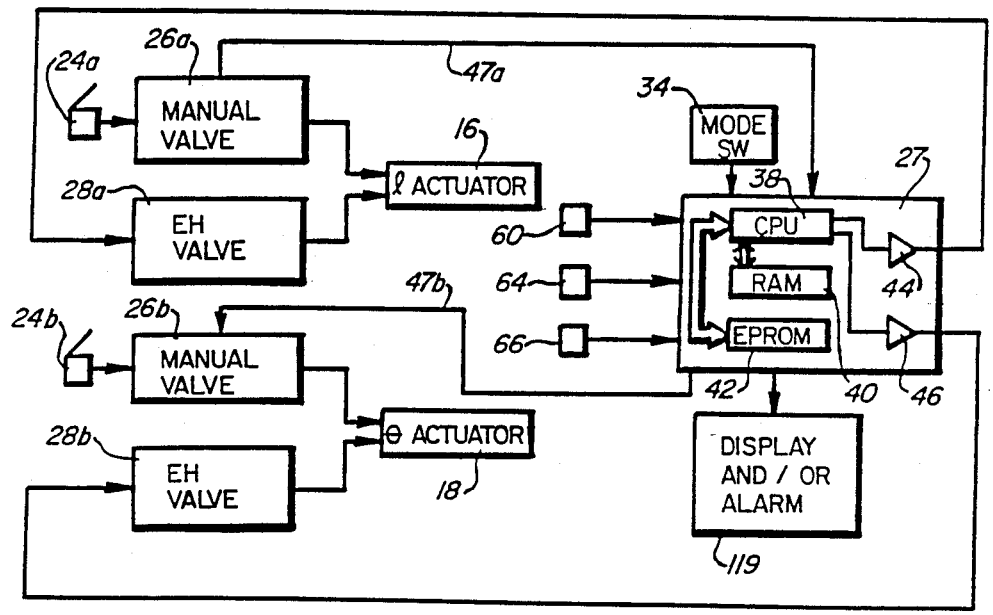
FIG. 2 is a block diagram of a preferred embodiment of a control system according to the present invention which may be utilized to control the machine shown in FIG. 1.

The embodiment shown in FIG. 2 may be modified by deleting one of the EH valves 28a,28b. In this event, operation of only one of the actuators 16,18 will be slaved to the operation of the other. In this embodiment, one of the branches in the flow chart of FIG. 4 comprising the blocks 74–82 or 86–96 can be deleted, depending upon which EH valve has been deleted.

Figure 5:
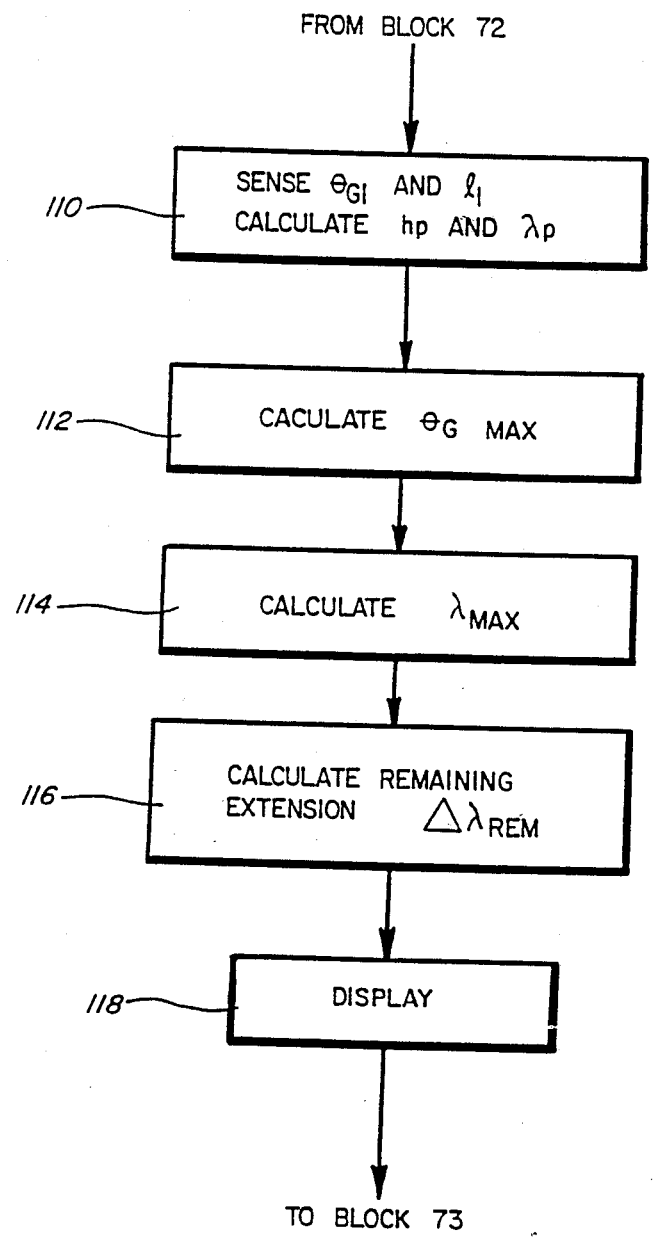
FIG. 5 is a flow chart of programming for calculating and indicating the amount of travel or throw remaining in the boom or arm shown in FIG. 1 when a command to move same in a straight line is issued.

Referring now to FIG. 5, there is illustrated a control program which may be inserted between the blocks 72 and 73 shown in FIG. 4 to calculate and display the amount of travel or throw of the boom remaining when the control is operating in the second mode of operation and a command is issued to move in a straight line path. In this embodiment, immediately following the block 72, a block 110 senses the present boom angle $\theta_{G1}$ and the present boom length $l_1$ and calculates a pair of values $h_p$ and $\lambda_p$ as follows:

$$h_p = l_1 \sin \theta_{G1} + k \qquad (9)$$

$$\lambda_p = l_1 \cos \theta_{G1} \qquad (10)$$

The values $h_p$ and $\lambda_p$ represent the projection of the boom in the vertical and horizontal planes.

A block 112 then calculates a value $\theta_{GMAX}$ as follows:

$$\theta_{GMAX} = \arcsin \frac{(h_p - k)}{l_{MAX}} \qquad (11)$$

where $l_{MAX}$ is the maximum extension or length of the boom that can be accomplished. The value $\theta_{GMAX}$ is then used in an equation to calculate a value $\lambda_{MAX}$ as follows:

$$\lambda_{MAX} = l_{MAX} \cos \theta_{GMAX} \qquad (12)$$

The value $\lambda_{MAX}$ is used to calculate the amount of horizontal throw of the boom as follows:

$$\Delta \lambda_{rem} = \lambda_{MAX} - \lambda_p \qquad (13)$$

The value $\Delta \lambda_{rem}$ can be compared against a preselected limit in order to determine whether sufficient throw is available to carry out a commanded movement. If the remaining throw is less than such limit, an alarm may be actuated and/or the value $\Delta \lambda_{rem}$ may be displayed under control of a block 118 by an alarm/indicating device 119, FIG. 2.

Following the block 118, control passes to the block 73, FIG. 3.

It should be noted that the equations solved by the control program may be modified to calculate the amount of throw remaining in a different direction, such as the throw remaining in the vertical plane or in a line coincident with the desired straight-line path of movement, if desired.

Figure 6:
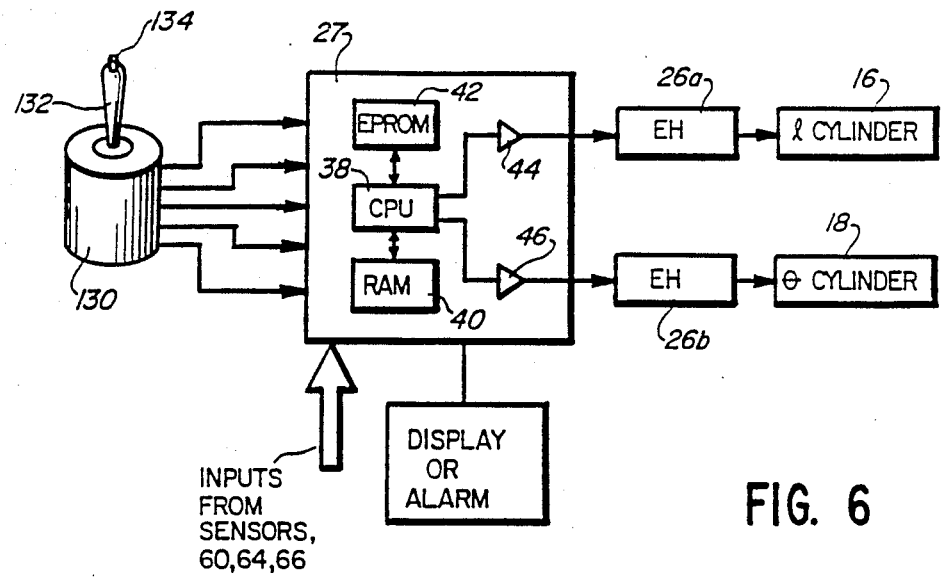
FIG. 6 is a block diagram of a second alternative embodiment of the present invention.

Referring now to FIG. 6, there is illustrated an alternative embodiment of the invention which eliminates the need for the manual valves 26a,26b. Instead, a joystick 130 is used to control the actuators 16,18 via the processor 27 and the EH valves 28a,28b. In this embodiment of the invention, the joystick 130 is a device which includes four potentiometers, the wipers of which are controlled by a joystick actuator handle 132 which is movable from a neutral position to a plurality of operating positions. Each potentiometer generates a separate output signal representing signal representing the position of the actuator handle 132 relative to the neutral position. In addition, a fifth output is generated by a mode switch 134 in the form of a pushbutton or other switch located on the tip of the handle 132 or at another position on the joystick or its vicinity.

Figure 6A:
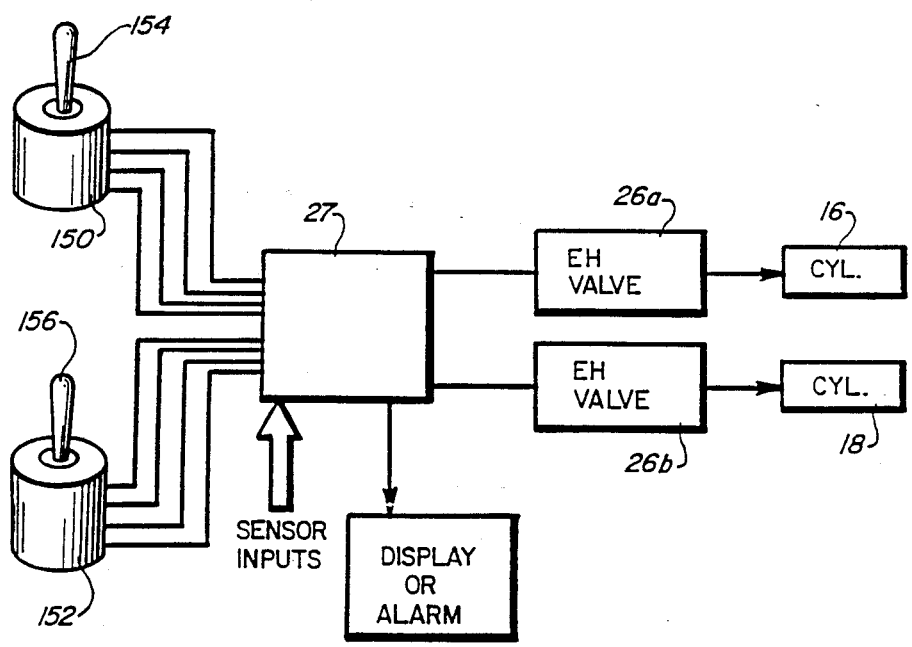
FIG. 6a is a block diagram of a third alternative embodiment of the control system of the present invention.

Referring to FIG. 6a, the joystick 130 shown in FIG. 6 may be replaced by a pair of joysticks 150,152, each of which includes four potentiometers which develop signal outputs representing the position of actuator handles 154,156 respectively.

It should be noted that the potentiometers in the joysticks 130,150,152 may be replaced by other position transducers, such as LVDT's, digital position encoders, or the like.

Alternatively, the joystick 130 or the joysticks 150,152 may be replaced by any other type of input device, such as two independent single axis handles, a rolling ball or even a computer, if desired.

In the case of the system shown in FIG. 6a, one of the joysticks 150,152 is used to enter commands which effect the first mode of operation while the other joystick commands operation in the second mode. In the control system shown in FIG. 6a, an interlock may be provided to prevent simultaneous movement of the control handles of both joysticks 150,152 from resulting in an indeterminate mode of operation. This interlock may be in the form of a manually operable switch or may be provided by the control program stored in the processor 27.

Figure 7:
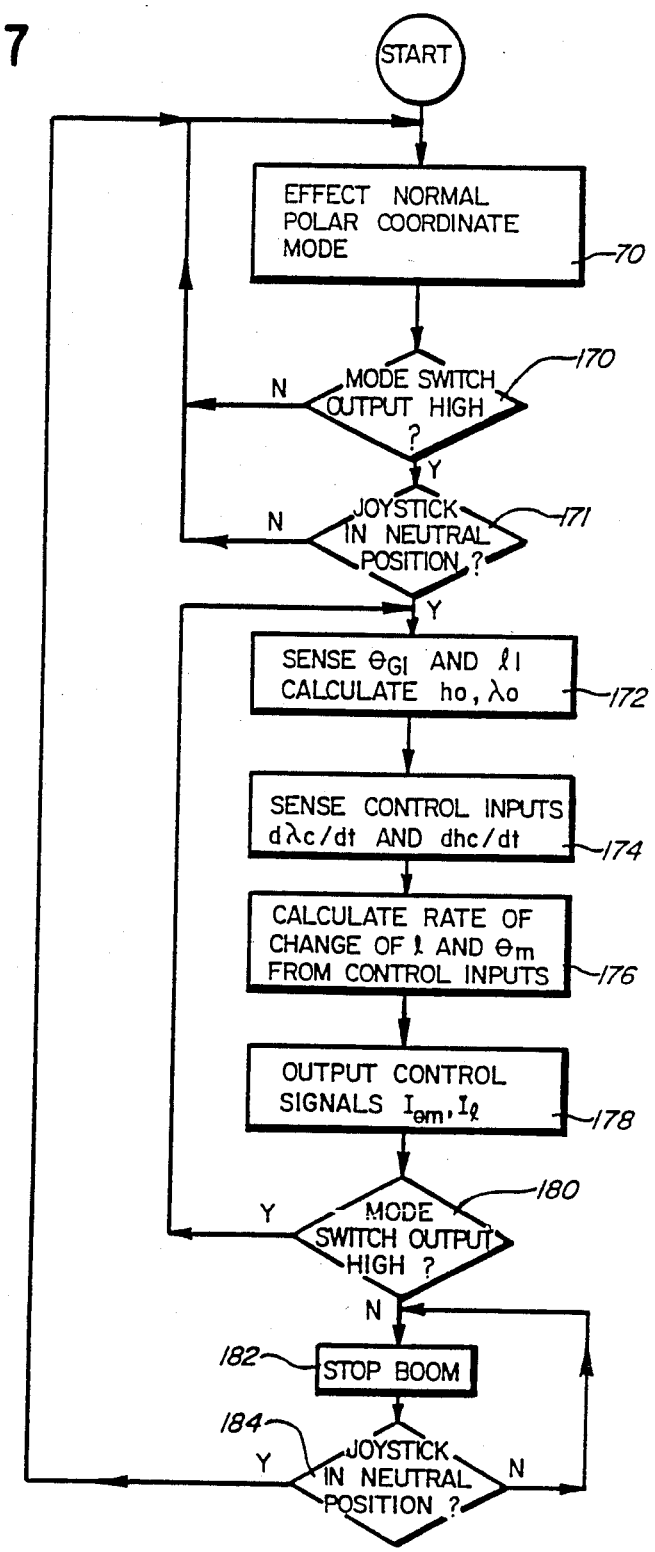
FIG. 7 is a flow chart of the programming contained in the memory shown in FIG. 6.

Referring now to FIG. 7, there is illustrated the control program stored in the memory 42 of the microcomputer 27 shown in FIG. 6. The control program includes the block 70 described in connection with FIG. 4 which effects the normal or conventional polar coordinate operating mode when the mode switch 134 is in a first position. However, when the switch 134 is moved to a second position, the output of the switch 134 is in a high state and control passes to a block 171. The block 171 checks the outputs of the joystick 130 to determine whether the actuator handle 132 is in the neutral position. If so, control passes to a block 172. If not, or if the mode switch output is in a low state, control returns to the block 70.

The block 172 calculates the position of the end of the boom relative to a reference, such as the position of the rear axle 173 of the machine as seen in FIG. 1. This position is defined in terms of a pair of variables $h_0$ and $\lambda_0$ which are calculated as follows:

$$h_0 = l_1 \sin \theta_{G1} = k \qquad (14)$$

$$\lambda_0 = l_1 \cos \theta_{G1} \qquad (15)$$

where $l_1$, $\theta_{G1}$ and k are the terms previously defined.

Control from the block 172 then passes to a block 174 which senses the command input from the joystick 130. In the preferred embodiment, the displacement of the joystick handle 132 from the neutral position is proportional to the desired rate of movement of the end of the boom. Moreover, the direction of movement of the handle controls the direction of straight line displacement of the end of the boom. In the preferred embodiment, forward and aft movement of the handle moves the end of the boom 12 in a straight line path in a vertical plane while side-to-side movement of the handle moves the end of the boom in a straight line path in a horizontal plane.

The signals from the joystick 130 or 152, denoted $d\lambda_c/dt$ and $dh_c/dt$, representing the commanded rate of change of the end of the boom in the $\lambda$ or h directions is utilized by a block 176 to calculate the required rate of change of displacement of the actuators 16,18 to effect the commanded movement. These rates of change are calculated from the following equations:

$$\frac{dl}{dt} = \frac{d\lambda_c}{dt} \cos\theta_{G1} + \frac{dh_c}{dt} \sin\theta_{G1} \quad (16)$$

$$\frac{d\theta_m}{dt} = \frac{d\lambda_c}{dt} \frac{\sin\theta_{G1}}{l_1} + \frac{dh_c}{dt} \frac{\cos\theta_{G1}}{l_1} \quad (17)$$

where $l_1$ is the current length of the boom and $\theta_{G1}$ is the current angle of the boom as sensed by the block 172. The values $dl/dt$ and $d\theta_m/dt$ are utilized by a block 178 to create control signals $I_{\theta m}$ and $I_l$ which are used to control the valves 26a,26b to in turn cause the actuators 16,18 to move the end of the boom in the commanded straight line path.

Following the block 178, a block 180 determines whether the output of the switch 134 is still in the high state. If so, control returns to the block 172 which again senses the current position of the boom. Control remains in the loop consisting of the blocks 172-180 until the block 180 determines that the output of the mode switch 134 is the low state. When this occurs, a block 182 inhibits further boom movement and control passes to a block 184. The block 184 checks to determine whether the joystick handle 132 is returned to the neutral position. When this happens, control returns to the block 70 which effects the normal polar coordinate operating mode.

In the case of system shown in FIG. 6a, the control program shown in FIG. 7 is modified to delete the blocks 170, 180 and 184. Also, control passes from the block 70 to the block 172 only when the actuator handle 156 is moved out of its neutral position and the actuator handle 154 of the joystick 150 is in the neutral position. Further, control passes from the block 178 back to the block 172 until both actuator handles 154,156 are returned to their neutral positions, at which point further movement of the end of the boom is stopped and control returns to the block 70.

It should also be noted that, in each of the embodiments, it may be desired to produce repeated straight line movements in the same path. In this case, information identifying the path in which the end of the boom is to be moved may be entered into the microprocessor by means of an input device, for example a potentiometer, and a second command means, such as a single axis control handle, would then be utilized to cause movement in the prescribed path.

We claim:

1. A control system for a member which is movable by first and second actuators that control the angle of the member relative to a reference and the length of the member, respectively, comprising:

first means for independently controlling each of the two actuators while in a first mode of operation;

means for manually entering a command to the system to move the end of the member along a selected substantially straight line path;

second means operative at the time a command is being manually entered to the system for continuously controlling the actuators to effect straight line movement of the end of the member while in a second mode of operation to thereby simultaneously control angle and length; and means coupled to the first and second controlling means for manually selecting one of the two modes of operation.

2. The control system of claim 1, wherein the second controlling means includes an electrohydraulic valve for operating one of the actuators.

3. The control system of claim 1, further including means for calculating the amount of travel of the member remaining when the second mode of operation is selected.

4. The control system of claim 1, wherein the second controlling means includes a manual valve for directly controlling the second actuator, means coupled to the member for sensing the length thereof and means responsive to the sensing means for controlling the first actuator to change the angle of the member as the length thereof changes to move the end of the member in a straight line.

5. The control system of claim 1, wherein the controlling means includes a manual valve for directly controlling the first actuator, means coupled to the member for sensing the angle thereof relative to the reference and means responsive to the sensing means for controlling the second actuator to change the length of the member as the angle thereof changes to move the end of the member in a straight line.

6. The control system of claim 1, wherein the entering means comprises a joystick, the first and second controlling means comprise a processor coupled to the joystick and first and second electrohydraulic valves coupled between the processor and the actuators.

7. A control system for a boom which is movable by first and second actuators that control the angle of the member and the length of the member, respectively, wherein the first and second actuators are controlled by first and second valves, respectively, comprising:

a processor coupled to at least one of the first and second valves;

means coupled to the processor for manually entering input commands to the system, wherein the entering means is actuable in a first mode of operation to independently control the two valves and is actuable in a second mode of operation to cause the processor to control at least one of the valves to move the end of the boom along a selected substantially straight line path responsive to and simultaneous with manual entering of an input command; and means coupled to the entering means for manually selecting one of the two modes of operation.

8. The control system of claim 7, wherein the entering means comprises a joystick which, in the first mode of operation, independently controls the first and second valves and which, in the second mode of operation, controls the valves through the processor.

9. The control system of claim 8, wherein the first and second valves are of the electrohydraulic type.

10. The control system of claim 7, wherein the entering means comprises a joystick and a further manual input device wherein the joystick, in the first mode of operation, independently controls the first and second valves and wherein the further manual input device, in the second mode of operation, controls one of the valves while the other valve is controlled by the processor.

11. The control system of claim 10, wherein the other valve is of the electrohydraulic type.

12. A method of controlling movement of an end of a boom wherein the length and the angle of the boom are adjustable by length and angle actuators, respectively, comprising the steps of:
 (a) providing command means operable responsive to a manual input for developing a command signal to command operation of one of the actuators;
 (b) operating the one actuator in response to receipt of the command signal to cause one of the length and angle of the boom to change so that the boom is moved;
 (c) detecting movement of the boom in response to operation of the one actuator; and
 (d) automatically operating the other actuator in response to the detected movement of the boom such that both of the length and angle of the boom change to in turn cause the end of the boom to move along a selected substantially straight line path.

13. The method of claim 12 wherein the automatically operating step is implemented in one mode of operation and further comprising the step of providing means for independently controlling each of the actuators in another mode of operation and the step of selecting which one of the two modes of operation to implement.

14. The method of claim 12 wherein the providing step comprises providing command means operable responsive to a manual input for developing a command signal to command operation of the length actuator to control adjustment of the length of the boom.

15. The method of claim 12 wherein the providing step comprises providing command means operable responsive to a manual input for developing a command signal to command operation of the angle actuator to control adjustment of the angle of the boom.

16. The method of claim 12 wherein the providing step comprises providing command means operable responsive to a manual input from a switch operable to select a particular mode of operation for developing a command signal to command operation of one of the actuators.

17. The method of claim 12 wherein step (a) is operable to command operation of the angle actuator to control adjustment of the angle of the boom.

* * * * *